No. 881,980. PATENTED MAR. 17, 1908.
H. D. WATERHOUSE.
SENDING MECHANISM FOR PNEUMATIC DESPATCH APPARATUS.
APPLICATION FILED OCT. 26, 1907.
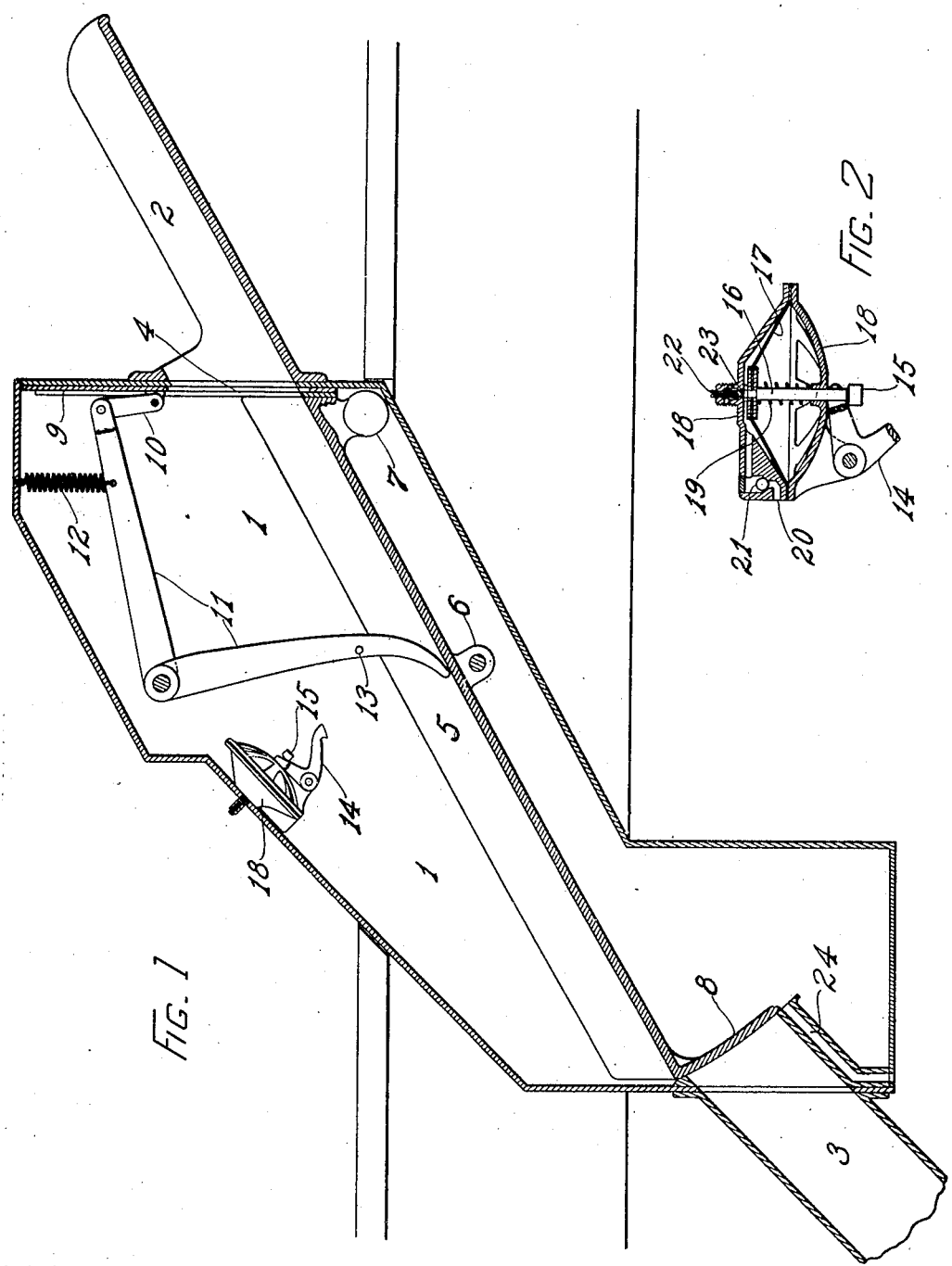
WITNESSES
A. C. Richardson.
Edward S. Day
INVENTOR
Harold D. Waterhouse
by Phillips Van Everen & Fish
Attys.

UNITED STATES PATENT OFFICE.

HAROLD D. WATERHOUSE, OF QUINCY, MASSACHUSETTS, ASSIGNOR TO UNITED STORE SERVICE AND TUBE COMPANY, OF BOSTON, MASSACHUSETTS, A CORPORATION OF MAINE.

SENDING MECHANISM FOR PNEUMATIC-DESPATCH APPARATUS.

No. 881,980.  Specification of Letters Patent.  Patented March 17, 1908.

Application filed October 26, 1907. Serial No. 399,332.

*To all whom it may concern:*

Be it known that I, HAROLD D. WATERHOUSE, citizen of the United States, residing at Norfolk Downs, Quincy, in the county of Norfolk and State of Massachusetts, have invented certain new and useful Improvements in Sending Mechanism for Pneumatic-Despatch Apparatus; and I do hereby declare the following to be a full, clear, and exact description of the invention, such as will enable others skilled in the art to which it appertains to make and use the same.

The invention relates to pneumatic despatch systems, and more especially to sending mechanism through which carriers are introduced into the transmission tube.

The object of the invention is to provide an improved construction of sending mechanism which will enable carriers to be despatched in rapid succession and at proper intervals without loss of air from the transmission tube, and without requiring any attention on the part of the operator other than to place the carriers successively in position to be delivered to the transmission tube.

The apparatus embodying the various features of the invention comprises a sending chamber through which the carriers are introduced into the transmission tube, and devices which are controlled by the introduction and transmission of a carrier in such manner that the opening through which the carrier enters the sending chamber is closed behind the carrier immediately after the carrier enters the chamber, and that the opening through which the carrier passes from the sending chamber to the transmission tube opens after the carrier has entered the sending chamber to allow the carrier to pass from the sending chamber into the transmission tube, and subsequently closes before the entrance of the sending chamber again opens to admit another carrier.

One feature of the invention consists in providing a carrier support within the sending chamber which is normally out of line with the transmission tube and is brought into line with the tube by the introduction of the carrier, means being also provided for closing the sending chamber during the transfer of the carrier from the movable support to the transmission tube. A gate is provided for closing the opening through which the carrier passes from the support into the transmission tube, and this gate is preferably connected with the movable support so that it is opened by the movement of the support into line with the transmission tube. Any suitable construction of outer gate may be employed in connection with this feature of the invention for closing the entrance to the sending chamber during the transfer of the carrier from the movable support to the transmission tube, which will close after the carrier has entered the sending chamber and will remain closed until the carrier has entered the transmission tube and the opening through which it enters has been closed.

A further feature of the invention consists in so arranging the gate which closes the opening through which the carrier enters the sending chamber that this gate is normally open and is closed by the introduction of a carrier and remains closed until the carrier has been despatched, and the opening between the sending chamber and transmission tube has closed. This feature of the invention may be embodied in constructions which do not embody the feature of the movable support within the sending chamber, in which case any suitable means may be employed for controlling the opening through which the carrier passes from the sending chamber to the transmission tube so that this opening will be normally closed and will be automatically opened to allow the transfer of the carrier from the sending chamber to the transmission tube. It will also be understood that the movable support may be embodied in constructions which do not embody the feature of an outer gate which is normally open, although it is preferred to embody both of these features in the same apparatus.

The features above referred to, as well as the further features which are hereinafter described and referred to in the claims, will be understood from the accompanying drawing, in which Figure 1 is a vertical sectional view of a sending mechanism embodying the features of the invention in the forms in which I prefer to use them, and Fig. 2 is a detail of the timing device.

In the construction shown the sending chamber 1 is arranged between a carrier receiving chute 2 and the transmission tube 3. The receiving chute 2 is inclined, and its lower end registers with the entrance opening 4 through which carriers placed in the chute 2 pass into the sending chamber. Within the sending chamber is mounted an inclined carrier support 5 which is mounted upon trunnions 6, and is held in normal position by means of a weight 7. When in normal position, the upper end of the carrier support 5 engages the wall of the sending chamber, and the support is in line with and forms a continuation of the chute 2. The lower end of the carrier support 5 is provided with a downwardly extending plate 8 which fits against the upper end of the transmission tube 3, and forms an inner gate for closing the opening through which the carrier passes from the sending chamber to the transmission tube. The entrance end of the sending chamber is provided with a vertically sliding plate 9 which forms an outer gate for opening and closing the entrance opening 4 through which the carriers enter the sending chamber. The sides of this gate are connected by means of links 10 with two arms of a bell crank lever 11, the other arm of which is arranged in the path of the carrier as it slides down the support 5. The lever 11 is held yieldingly in position with the gate 9 open by means of a spring 12.

When a carrier is placed in the receiving chute 2 it slides down the chute through the entrance opening 4 and down the carrier support 5 within the sending chamber. As the carrier slides down the support 5 it passes under the end of the bell crank lever 11, swinging the lever against the tension of the springs 12 and closing the gate 9. As the carrier reaches the lower end of the support 5 its weight acts to swing the carrier 5 about the trunnions 6, bringing the support into line with the transmission tube 3. This movement of the carrier support carries the plate 8 away from the end of the transmission tube so that the carrier slides down the support 5 into the transmission tube and is despatched. As soon as the carrier passes into the tube, the weight 7 acts to return the support 5 to normal position. This brings the plate 8 over the end of the transmission tube, closing the sending chamber to the transmission tube.

When the gate 9 is closed by the introduction of the carrier, the movement imparted to the bell crank lever 11 brings a pin 13 on the lever into position to be engaged by a pivoted latch 14, the weight of which tends to swing the latch into position to engage the pin 13. At this time, however, the latch 14 is held back by means of a lug 15 secured on a rod 16 and arranged to engage the tail of the latch. The rod 16 is connected to a diaphragm 17 which is arranged in a diaphragm casing 18, and is held normally in the position shown by a spring 19. The chamber above the diaphragm communicates through a port 20 with the interior of the sending chamber, the passage of air through the port being controlled by a check valve 21. The escape of air from the chamber above the diaphragm is controlled by a needle valve 22, by which the size of the vent 23 for the chamber may be regulated.

While the lever 11 is still held by the carrier in position for the latch 14 to engage the pin 13, the swinging movement of the carrier support 5 opens communication between the transmission tube 3 and the sending chamber, so that the pressure in the transmission tube is admitted to the sending chamber. Some of the compressed air in the sending chamber immediately enters the chamber above the diaphragm 17, forcing the lug 15 downward, and freeing the latch 14 so that it engages the pin 13 and prevents the opening of the valve 9 when the carrier passes from under the lever 11. When the carrier support 5 first begins to swing, the lower edge of the plate 8 closes a vent passage 24 leading from the chamber to the atmosphere, and when the carrier support returns to its normal position this vent is opened, allowing the compressed air within the sending chamber to escape into the atmosphere. The check valve 21, however, prevents the escape of the air in the chamber above the diaphragm 17 into the sending chamber, and this air gradually passes out through the restricted vent 23. As the air escapes from the chamber above the diaphragm the spring 19 forces the rod 16 upward, so that the lug 15 acts to withdraw the latch 14 from the pin 13, thus allowing the gate 9 to be opened by the springs 12, preparatory to the introduction of another carrier.

During the time that the gate 9 is held closed by the latch 14, the introduction of a second carrier into the sending chamber is prevented, and the devices for controlling the withdrawal of the latch 14, therefore, act as a timing device for controlling the interval between successive carriers.

Having explained the nature and object of the invention, and specifically described one form of apparatus in which it may be embodied, what I claim is:—

1. In a pneumatic despatch system, a sending chamber through which carriers are introduced into the transmission tube, a carrier support within the chamber normally out of line with the transmission tube and brought into line therewith by the introduction of a carrier, and means closing the sending chamber during the transfer of the carrier from the support to the transmission tube, substantially as described.

2. In a pneumatic despatch system, a sending chamber through which carriers are introduced into the transmission tube, a carrier support mounted therein to move into line with the transmission tube upon the introduction of a carrier, a gate connected with the carrier support normally closing the chamber to the transmission tube, and means closing the entrance to the sending chamber during the movement of the support into line with the transmission tube, substantially as described.

3. In a pneumatic despatch system, a sending chamber through which carriers are introduced into the transmission tube, a carrier support mounted to move into line with the transmission tube upon the introduction of a carrier, a gate connected with the carrier support normally closing the chamber to the transmission tube, means closing the entrance to the chamber during the movement of the carrier support into line with the transmission tube, and a timing device for controlling the introduction of the succeeding carriers, substantially as described.

4. In a pneumatic despatch system, a sending chamber through which carriers are introduced into the transmission tube, inner and outer gates for closing the chamber, and means actuated by the introduction of a carrier to close the outer gate and thereafter to open the inner gate, substantially as described.

5. In a pneumatic despatch system, a sending chamber through which carriers are introduced into the transmission tube, a gate for closing the entrance to said chamber, means for closing said gate by the introduction of a carrier, and means actuated by the introduction of a carrier to open the chamber to the transmission tube, substantially as described.

6. In a pneumatic despatch system, a sending chamber through which carriers are introduced into the transmission tube, an inclined carrier support pivotally mounted within the sending chamber out of line with the transmission tube and movable into line therewith by the weight of the carrier, and means for returning the support to normal position after the carrier has entered the transmission tube, substantially as described.

7. In a pneumatic despatch system, a sending chamber through which carriers are introduced into the transmission tube, an inclined carrier support pivotally mounted within the sending chamber and held normally out of line with the transmission tube, and a plate connected with said support arranged to close the opening between the transmission tube and sending chamber when the support is in normal position, substantially as described.

8. In a pneumatic despatch system, a sending chamber through which carriers are introduced into the transmission tube, a gate normally closing the carrier opening between the transmission tube and chamber and automatically opened by the introduction of the carrier, a gate for closing the entrance to the sending chamber normally open, and means operated by the introduction of a carrier for closing the outer gate and means for opening the outer gate after the despatch of a carrier, substantially as described.

In testimony whereof I affix my signature, in presence of two witnesses.

HAROLD D. WATERHOUSE.

Witnesses:
 IRA L. FISH,
 ANNIE C. RICHARDSON.